United States Patent
Gilmore et al.

(10) Patent No.: US 12,439,109 B2
(45) Date of Patent: Oct. 7, 2025

(54) SYSTEMS AND METHODS FOR DETERMINING OPTIMAL FREQUENCY RANGE FOR MAXIMIZING RESPONSE RATE

(71) Applicant: Tatari, Inc., San Francisco, CA (US)

(72) Inventors: Rudy C. Gilmore, Woodinville, WA (US); Brent L. White, Jr., Charlotte, NC (US); Michael D. Swinson, Los Angeles, CA (US)

(73) Assignee: TATARI, INC., San Francisco, CA (US)

( * ) Notice: Subject to any disclaimer, the term of this patent is extended or adjusted under 35 U.S.C. 154(b) by 0 days.

(21) Appl. No.: 18/647,288

(22) Filed: Apr. 26, 2024

(65) Prior Publication Data
US 2024/0364950 A1    Oct. 31, 2024

Related U.S. Application Data

(60) Provisional application No. 63/498,683, filed on Apr. 27, 2023.

(51) Int. Cl.
*H04N 21/25* (2011.01)
*H04N 21/466* (2011.01)

(52) U.S. Cl.
CPC ....... *H04N 21/252* (2013.01); *H04N 21/4667* (2013.01)

(58) Field of Classification Search
CPC ............. H04N 21/252; H04N 21/4667; H04N 21/812; G06Q 30/0242; G06Q 30/0246
USPC .......................................................... 725/114
See application file for complete search history.

(56) References Cited

U.S. PATENT DOCUMENTS

| | | | |
|---|---|---|---|
| 11,107,117 B1 * | 8/2021 | Calabrese | G06Q 30/0244 |
| 11,212,566 B1 | 12/2021 | Swinson et al. | |
| 11,334,912 B1 | 5/2022 | Chen et al. | |
| 2010/0088714 A1 * | 4/2010 | Hawkins | H04H 20/14 725/14 |
| 2022/0321956 A1 * | 10/2022 | Fairchild | H04N 21/812 |

* cited by examiner

*Primary Examiner* — Cynthia M Fogg
(74) *Attorney, Agent, or Firm* — Sprinkle IP Law Group

(57) ABSTRACT

A method for determining an optimal frequency range for maximizing the response rate may include Internet Protocol (IP)-level impressions from impression data, rolled up the IP-level impressions to household-level impressions, and then correlate the household-level impressions with response and conversion rates so as to determine impressions with associated attribution. Each impression is assigned to a frequency bin based on a rolling frequency calculation. Relative net funnel efficiencies (NFEs) can then be determined by comparing different frequency bins, each respective frequency bin containing frequency-specific impressions, a frequency-specific response rate, a frequency-specific conversion rate, an NFE determined from the frequency-specific response rate and the frequency-specific conversion rate, and a relative NFE for the respective frequency bin. A frequency-response profile containing the relative NFEs is generated and provided as input to an optimal frequency algorithm so as to produce an optimal frequency range which, in turn, is displayed on a client device.

20 Claims, 6 Drawing Sheets

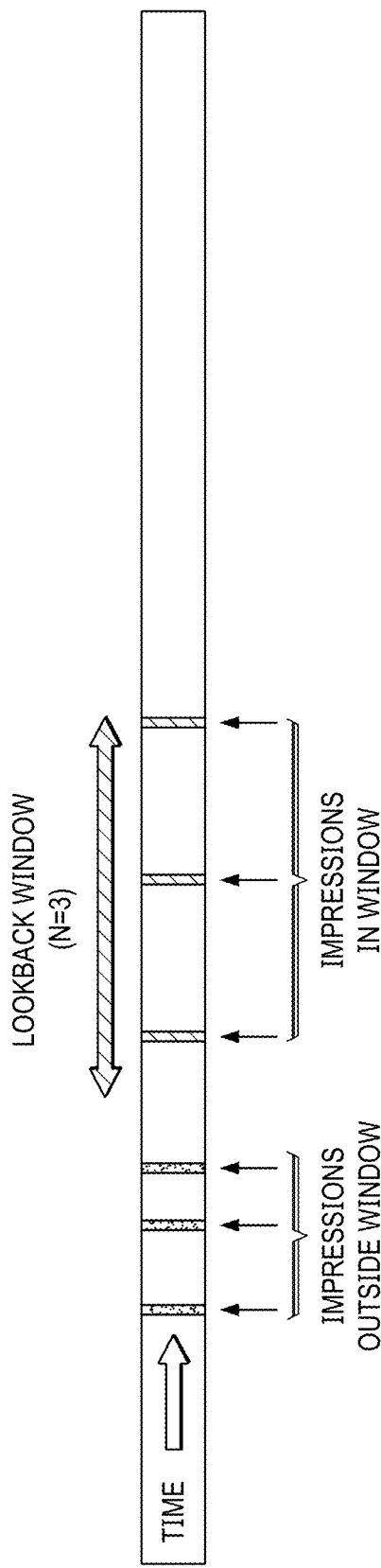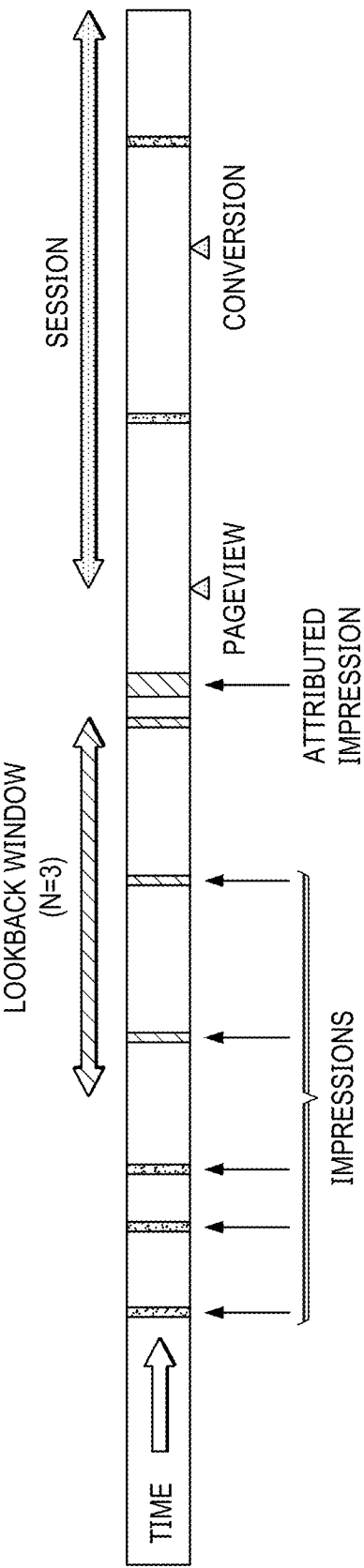

SYSTEMS AND METHODS FOR DETERMINING OPTIMAL FREQUENCY RANGE FOR MAXIMIZING RESPONSE RATE

CROSS-REFERENCE TO RELATED APPLICATION(S)

This application claims a benefit of priority under 35 U.S.C. § 119(e) from U.S. Provisional Application No. 63/498,683, filed Apr. 27, 2023, entitled "SYSTEMS AND METHODS FOR DETERMINING OPTIMAL FREQUENCY RANGE FOR MAXIMIZING RESPONSE RATE," the entire content of which is hereby fully incorporated by reference herein for all purposes.

TECHNICAL FIELD

This disclosure relates generally to data analytics. More particularly, this disclosure relates to systems and methods for programmatically determining, based on a frequency response profile, an optimal frequency range so as to maximize a response rate.

BACKGROUND OF THE RELATED ART

With the advent of the Internet, many aspects of modern life are now digitally connected through the seemingly ubiquitous smart phones, smart televisions (TV), smart home appliances, Internet of Things (IoT) devices, websites, mobile apps, etc. Even so, many more analog aspects remain disconnected from this digital world. Linear TV is an example of an offline medium that is disconnected from the digital world.

"Linear TV" refers to real time (live) television services that transmit TV program schedules. Almost all broadcast TV services can be considered as linear TV. Non-linear TV covers streamlining and on-demand programming, which can be viewed at any time and is not constrained by real-time broadcast schedules. Video-on-demand (VOD) and near video-on-demand (NVOD) transmissions of pay-per-view programs over channel feeds are examples of non-linear TV.

Because linear TV is an offline medium, it is not possible to automatically collect information on viewers of linear TV. This creates a data gap problem. To address this data gap program, Nielsen Media Research devised audience measurement systems to determine the audience size and composition of television programming in the United States. Nielsen television ratings are gathered in one of two ways—using viewer diaries or set meters attached to TVs in selected homes. The former requires a target audience self-record their viewing habits. The latter requires a special device to collect specific viewing habits on a minute to minute basis and send the collected information to Nielsen's system over a phone line.

While Nielsen's audience measurement systems can provide some quantified measures of audience response to TV programs, the Nielsen television ratings do not measure how TV commercials (referred to herein as "media creatives," "ads," "ad spots," "TV spots," or "spots") attribute to a website's online traffic. This is, in part, because there is a natural distinction between two mediums: online (e.g., search engine marketing) and offline (e.g., linear TV).

The online medium is effective when consumers are already accessing the Internet through a website or mobile app. When a user is attracted to a product and visits a website for the product through the online medium (e.g., the website or mobile app showing an ad about the product), there is a session associated with that referring website or mobile app. Thus, tracking a website visitor's movement from an online medium to the website is a relatively straightforward process that can be done through tracking the session at the website (e.g., using a tracking pixel embedded in a page or pages of the website or mobile app that sends data to a server of the website operator or a third-party entity).

The offline medium, on the other hand, aims to drive consumers first to the Internet and then to the product's website or app. Unlike the online medium, there is neither session tracking nor a direct relationship between the offline medium and the desired result. Thus, suppose a spot that aired on linear TV encouraged its viewer to visit a website or download an app, it can be extremely difficult to measure the impact of that spot and quantifiably attribute any website visit or app download to the particular spot.

The natural distinction between the online and offline mediums creates a data gap between the digital world and the analog world. In turn, this data gap makes it difficult to correlate data from the digital world and the analog world and accurately measure the impact or attribution of a TV spot to a website's traffic. In the past, a typical approach for evaluating the performance of a TV commercial is to define the efficiency (E) of that TV commercial as Response per Amount Spent where E is defined as E=100*lift/(ad spend). In this case, "lift" is a metric for measuring a TV commercial in the context of a particular type of campaign—in this example, for measuring how much increase (lift) per $100 ad spend. This approach is generally independent to where and when the TV commercial aired on television networks.

U.S. Pat. No. 11,212,566, entitled "SYSTEMS AND METHODS FOR ATTRIBUTING TV CONVERSIONS," provides an example of how to qualitatively determine the impact or attribution of a TV spot to a website's traffic (which is referred to herein as "lift attribution"). An attribution system aggregates and merges online data and offline chronologically. The attribution system examines merged data for unique visitor (UV) sessions initiated at an online medium (e.g., a website) within an attribution window for a spot that aired on an offline medium (e.g., a TV network) and, for each conversion event that occurred in a UV session, assigns a session timestamp to it so that the conversion event is correlated to the spot. The attribution system then determines an overall conversion rate of UVs to the online medium in the attribution window and the attribution by the spot that aired on the offline medium to the overall conversion rate of UVs to the online medium in the attribution window. Results of the offline attribution to the online conversions can be visualized and presented on a client device communicatively connected to the attribution system.

U.S. Pat. No. 11,334,912, entitled "SYSTEMS AND METHODS FOR DETERMINING MEDIA CREATIVE ATTRIBUTION TO WEBSITE TRAFFIC," provides an example of a media creative attribution method, including determining a response profile within an attribution time window, the response profile being a portion of a UV curve associated with a website. In some cases, a shadow baseline analysis is run on every media creative that aired within an extended time window to determine whether to adjust the response profile. A total lift within the attribution time window is determined utilizing a baseline of the UV curve. A weight for each media creative that aired within the attribution time window is determined. Utilizing the weight, the total lift is allocated to individual media creatives that aired within the attribution time window. The allocated attribution can be utilized to generate performance metrics relating to the individual media creatives that aired within the attribution time window. The performance metrics such as cost per visitor can then be visualized through a user interface or dashboard.

SUMMARY OF THE DISCLOSURE

In the field of TV advertising, there are a variety of performance metrics. For example, the timing and frequency of adviews per potential customer can have a strong impact on advertising efficiency. On the one hand, a viewer may be more inclined to respond to an advertisement (which is also referred to herein as an "ad") if they have already viewed similar ads in the recent past. On the other hand, the same ad may reach a saturation point if the viewer has seen too many similar ads during the same time frame. Beyond this saturation point, adviews will have negligible additional impact. Therefore, "frequency," which is referred to herein as the number of ad impressions per device within a fixed time period (typically a week or month), is an important and fundamental metric for measuring ad performance in the field of TV advertising.

Knowing the frequencies that maximize a response likelihood is important, as it enables companies and entities alike (which are collectively referred to herein as "clients") to buy media in such a way that most viewers fall within an optimal range within which, given a spend level, the maximum lift and client revenue can be generated. Analytics and guidance around optimal frequency are also needed in improving campaign efficiency. Unfortunately, frequency is often not considered when performing analysis, leading to suboptimal performance.

In some embodiments, a method for determining an optimal frequency range for maximizing the response rate may include obtaining or receiving impression data from a source or sources once a day or several times a day and determining, from the impression data, Internet Protocol (IP)-level impressions. A system implementing the method may correlate the household-level impressions and response and conversion rates so as to determine impressions with associated attribution and assign each of the impressions to a frequency bin based on a rolling frequency calculation. In some embodiments, the system may obtain or receive a household device graph from a data service provider system. The household device graph stores household device information such as IP addresses, user agents, device types, etc. that can be used to correlate the IP-level impressions to household-level impressions. Each of the IP-level impressions, whether linked to a response or not, is assigned to a frequency bin based on a number of previous impressions associated with an IP address occurring within a given time window.

The system may determine relative net funnel efficiencies (NFEs) by comparing different frequency bins, each respective frequency bin containing frequency-specific impressions, a frequency-specific response rate, a frequency-specific conversion rate, an NFE determined from the frequency-specific response rate and the frequency-specific conversion rate, and a relative NFE for the respective frequency bin. Frequency bins refer to the aggregated household impression statistics at each positive integer frequency level, with a frequency of 1 being the lowest bin (households without impressions are not considered here). The relative NFE is defined as the NFE of a given frequency bin divided by the NFE of the lowest frequency bin. Then, the system can generate a frequency-response profile containing the different frequency bins, frequency-specific response rates, frequency-specific conversion rates, and the relative NFEs thus determined.

In some embodiments, the frequency-response profile is provided as input to an optimal frequency algorithm so as to produce an optimal frequency range based on the relative NFEs. The optimal frequency range, in turn, can be displayed through an user interface on a client device or provided to a downstream computing facility (e.g., for making recommendations based on the optimal frequency range for maximizing the response rate).

In some embodiments, the optimal frequency algorithm comprises a filtering stage and a calculation stage. At the filtering stage, filters may be applied to the frequency-specific response rates and the frequency-specific conversion rates to invalidate out-of-range NFEs and any frequency bin having out-of-range responses and out-of-range conversions.

In some embodiments, the calculation stage comprises identifying a frequency bin with highest NFE value and adding the frequency bin thus identified to the optimal frequency range.

One embodiment may comprise a system having a processor and a memory and configured to implement a method disclosed herein. One embodiment may comprise a computer program product that comprises a non-transitory computer-readable storage medium which stores computer instructions that are executable by a processor to perform the method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 3 illustrates an example of frequency binning for a single device according to some embodiments disclosed herein.

FIG. 4 illustrates an example of frequency binning with a converting response for the same single device of FIG. 3 according to some embodiments disclosed herein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Even when frequency is considered as a target variable in designing or evaluating advertising campaigns, a general approach is to rely on simplistic rules such as "N impressions per household per week is optimal." While such rules may be supported by aggregate historical results, they cannot account for the many nuances that can affect performance of a particular campaign: client industry, target audience, TV platform, and many other factors.

The advent of "big data" processing techniques, using IP-level data describing impressions and attribution events, provides an opportunity to provide a much more refined view of how ad performance varies with frequency. For instance, a frequency-response profile may provide guidance on ad frequencies that appear to be performing the best in a campaign. That is, a frequency-response profile can be used for making recommendations.

Figure 1:
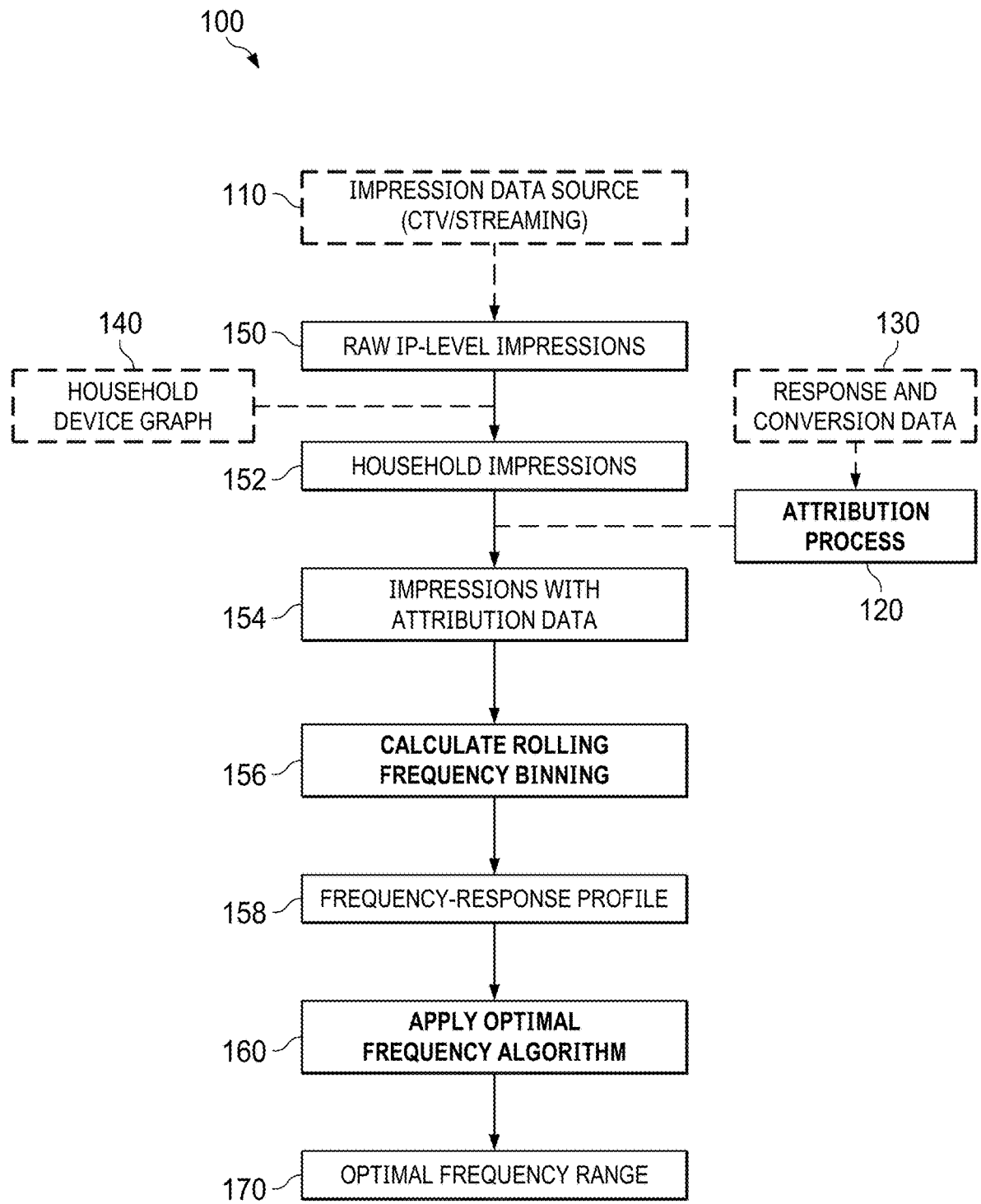
FIG. 1 depicts a flow diagram that illustrates an example of a method for generating a frequency-response profile according to some embodiments disclosed herein.

FIG. 1 depicts a flow diagram that illustrates an example of a method 100 for generating a frequency-response profile 158. In this example, the frequency-response profile 158 is provided as input to an optimal frequency algorithm 160 for determining an optimal frequency range 170.

In some embodiments, to generate a frequency-response profile, impression data is sourced from streaming content service providers (110). For instance, a system implementing the method 100 may obtain or receive a file (or files) containing impression data from a source (or sources) once a day or several times a day. The system unpacks the file(s) to obtain raw IP-level impressions 150 where ads were presented (i.e., the IP addresses of devices where the ads were delivered to). In the linear TV space, the term "impression" means an ad is presented on a screen of a viewing device (e.g., delivered to or otherwise displayed on a connected TV (CTV) such as an Internet-enabled TV), regardless of whether anyone (or how many) is actually viewing the ad. Today, linear TV is not necessarily "offline" and may be trackable through an Internet connection. However, the difficulty in correlating an impression with its viewer(s) remains as there is no way to know who, if any, is watching the ad.

In embodiments disclosed herein, the system may process the raw IP-level impressions to correlate IP-level impressions with information (e.g., IP addresses, user agents, device types, etc.) stored in a household device graph (database) 140. In one embodiment, the household device graph 140 can be provided by or obtained from a data service provider. In some embodiments, the system assigns a household identifier (ID) to each IP-level impression in the same household. In this way, the raw IP-level impressions can be rolled up to household-level impressions (152). These household-level impressions can be IP-level impressions delivered to and displayed on devices in, or otherwise belonging to, the same household, for instance, ads delivered to and displayed on a big screen TV, on a smartphone, on a laptop, etc. in the same house or building over a certain timeframe (e.g., a week, a day, etc.). At this time, the system still does not know if anyone is actually watching the impressions on devices belonging to the same household.

Through an attribution process 120, the system can cross reference the household-level impressions 152 and response and conversion data 130 to determine impressions with attribution data 154. The above-referenced U.S. Pat. Nos. 11,212,566 and 11,334,912, which are incorporated by reference herein, provide example attribution methodologies that can be used to determine response and conversion rates.

As a non-limiting example, to determine response and conversion rates, a 1-day view-through attribution methodology is used, where any response occurring within a 24 hour period after an impression is attributed to the associated impression. If multiple impressions have occurred within a 24 hour period, the response is attributed to the most recent impression. Conversions which occur within a 28-day session timeout are assigned to the most recent view-through response and, therefore, to the impression connected to that response.

Next, the system performs a rolling frequency binning of impressions (156). This is also referred to herein as "frequency windowing," described below. In some embodiments, each impression is assigned to an integer frequency bin based on a rolling frequency calculation, and an attribution calculation is applied to determine if the impression led to a detectable response or conversion event. Then, the relative efficacy of different frequency levels can be determined by comparing the aggregate event statistics of different frequency bins. Because a frequency-response profile includes several pieces of information as well as statistical uncertainties that must be considered, interpretation of results may require expertise from a human analyst.

To this end, an optimal frequency algorithm can be applied to programmatically determine the best frequencies for a client using IP-level data sources, and present these best frequencies over a numerical range via a user interface so that an authorized user of the client can compare against a frequency distribution in their advertising campaign. In contrast to raw frequency-response data, output from this algorithm can be generated without human intervention, allowing results to be provided much faster and at a scale that would be prohibitive for a manual process.

Frequency Response Profile

Some embodiments disclosed herein use the number of impressions that a given device has received within a fixed timeframe, such as one week. Device level frequency, which is measurable using techniques such as automatic content recognition or logs from streaming ad service platforms, can serve as a proxy for individual viewership, under the assumption that a typical individual receives most impressions from a single device over the timescales of interest.

With sufficient data, it is possible to compare conversion behavior for impressions falling into N=1, 2, etc. frequency buckets and examine the trends that emerge.

Metrics that might be of interest can be summarized as immediate responses to an ad display, such as a website visit, or downloading an app provided by a client, and deeper funnel conversions that provide monetization of a product or service, such as a purchase or subscription. In this disclosure, these events are referred to herein as "responses" and "conversions," respectively. The term "conversion rate" refers to the likelihood that a responding customer will go on to convert within a set timeframe, and the term "net funnel efficiency" ('NFE') refers to the product of conversion and response rates, which can be interpreted as the likelihood that an impression will lead to a monetization event.

Thus, $$NFE(f, \tau) = RR(f, \tau) * CR(f, \tau)$$

where RR is the response rate and CR is the conversion rate.

Both RR and CR are probabilities between 0 and 1, for a given ad frequency f and lookback timescale T. Note that NFE, RR, and CR are both incremental probabilities, i.e., they reflect the probability of response/conversion specifically linked on the nth impression within a timeframe T, not the likelihood of response/conversion for any impression within the timeframe.

minimum frequency possible is 1. This automated frequency assignment would typically be performed by a querying function (e.g., a batch processor running on a cluster of server machines) on database tables.

An example of bucketing logic for a single device is shown in FIG. 3. In this example, the rightmost impression has 2 other impressions within its lookback period (i.e., a "lookback window"), so it would fall in the N=3 frequency bucket.

FIG. 4 shows an example of bucketing logic for the same single device of FIG. 3 with a converting response. In this example, the impressions in the N=3 frequency bucket would count within the lookback period, so the "attributed" impression that resulted in a pageview and a conversion would be added to the N=4 frequency bucket, and tagged as being the originator of a response and conversion.

Referring to FIG. 1, Table 1 below shows an example frequency-response profile 158 produced by the frequency response analysis described above. In this case, the frequency-response profile 158 is an intermediary output for internal use by the system to profile the impression data in the batch for a particular enterprise client within a given time period (e.g., three months), with a lookback period (e.g., 1 week). In some embodiments, the system could run multiple batches at a time for multiple customers, each response-frequency profile per customer (e.g., for the same time period or varying time periods—if one time period does not have enough data, extend to multiple time periods).

TABLE 1

| Frequency | Impressions | Responses | Conversions | Response Rate | Conversion Rate | NFE | Relative NFE |
|---|---|---|---|---|---|---|---|
| 1 | 1,254,789 | 582 | 135 | 0.0464% | 23.2% | 0.0108% | 100% |
| 2 | 986,233 | 483 | 120 | 0.0490% | 24.8% | 0.0122% | 113% |
| 3 | 778,394 | 358 | 93 | 0.0460% | 26.0% | 0.0119% | 111% |
| 4 | 582,386 | 250 | 65 | 0.0429% | 26.0% | 0.0112% | 104% |
| 5 | 412,394 | 169 | 38 | 0.0410% | 22.5% | 0.0092% | 86% |
| 6 | 327,458 | 124 | 26 | 0.0379% | 21.0% | 0.0079% | 74% |
| 7 | 250,918 | 87 | 15 | 0.0347% | 17.2% | 0.0060% | 56% |
| 8 | 198,675 | 63 | 10 | 0.0317% | 15.9% | 0.0050% | 47% |

Figure 2:
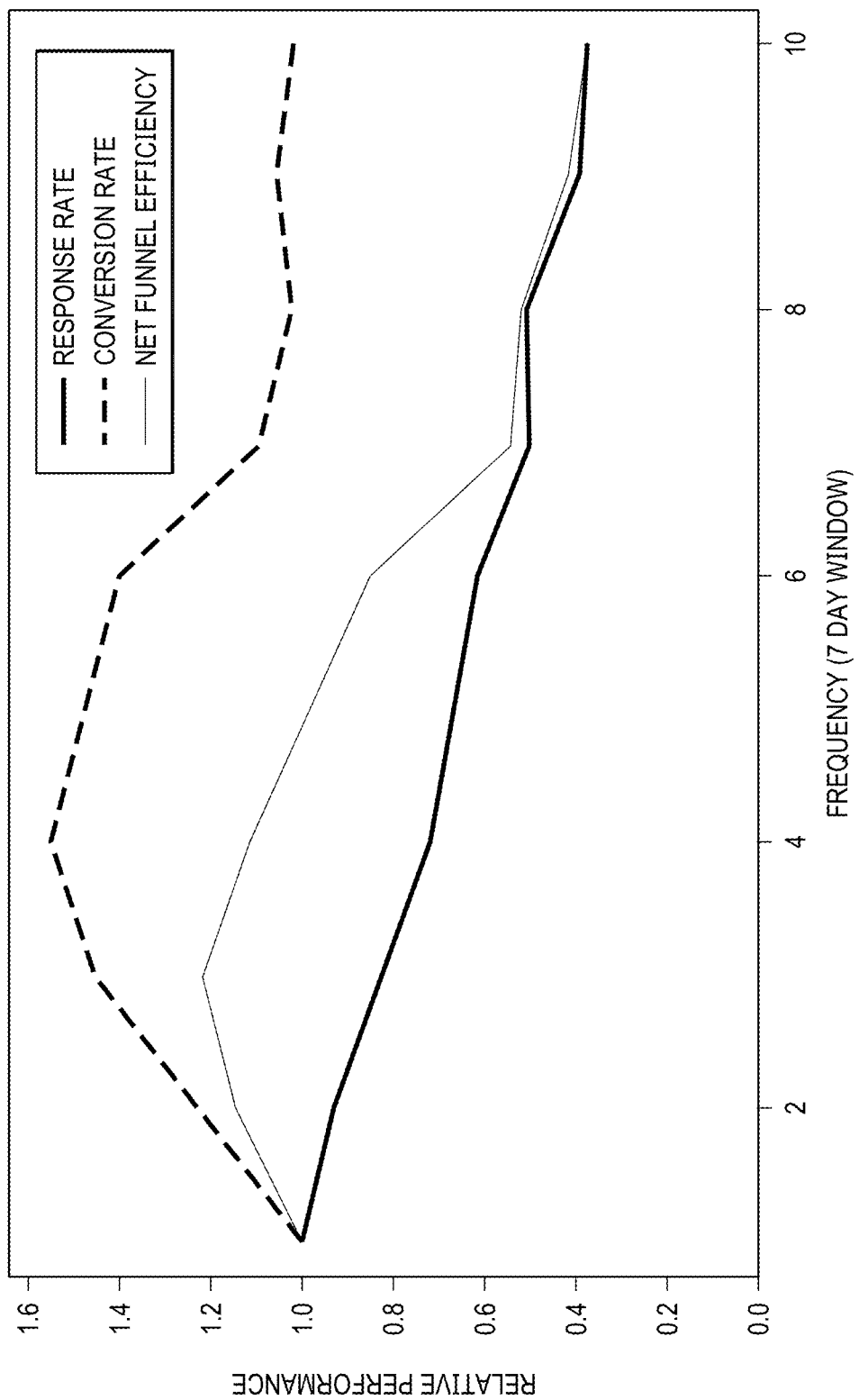
FIG. 2 depicts a plot diagram showing an example of a frequency response profile according to some embodiments disclosed herein.

In this disclosure, the term "Frequency Response Profile" refers to the variation in response, conversion, and NFE rates with windowed viewership frequency. FIG. 2 shows an example in which a window of one week is used as the lookback time.

FIG. 2 depicts a plot diagram showing an example of a frequency response profile 200 that could be used to determine the frequencies that are providing the highest efficiency for a target (e.g., an enterprise client). In this example, the N=3 frequency bin shows the highest efficiency based on the NFE plot. Judgements about overall performance at the higher frequency bins must also consider the possibility of large statistical uncertainties, particularly for conversion rate which tends to be based on a small number of observations.

Frequency Windowing

Every impression, whether linked to a response or not, is assigned to a frequency bin based on the number of previous impressions on the same device occurring within a given time window. In this disclosure, this is referred to as the "lookback period." Each impression is assigned a frequency number, and is flagged if it is linked to a response, or a response and subsequent conversion. Note that the frequency assignment includes the impression itself, so the Once response and conversion rates are computed (e.g., using an appropriate attribution methodology), the relative efficiency of different frequency buckets can be compared. As actual NFE values tend to be small numbers, a useful metric is relative NFE, which is the NFE of a given bin divided by the NFE of the f=1 bucket. Using this metric makes it easy to see if a frequency level is performing favorably compared to an ad impression for an as-of-yet-unexposed customer, and allow comparisons of different ad campaigns which may have different overall NFE ranges.

Conclusions drawn from the frequency response calculation tend to be based on relative NFE; however, the conversion count can become small in the higher frequency buckets, leading to a large statistical uncertainty in conversion rate and NFE. For this reason, it can be useful to also use relative response and conversion rates (not shown here) in making judgements about higher frequency performance.

Optimal Frequency Algorithm

As illustrated in FIG. 1, the frequency-response profile 158 produced by the frequency response analysis described above is provided as input to an optimal frequency algorithm 160. The optimal frequency algorithm 160 reads in the frequency-response profile 158 (e.g., Table 1), and returns a range of optimal frequencies 170. It does this by taking into account the following constraints:

Optimal frequency should be primarily based on relative NFE.

The bin with the highest NFE that is statistically sound should be included in the range.

The calculation should return a null result if an insufficient number of bins pass a minimum threshold for statistical significance, or an insufficient number of bins are included in the range.

Figure 5:
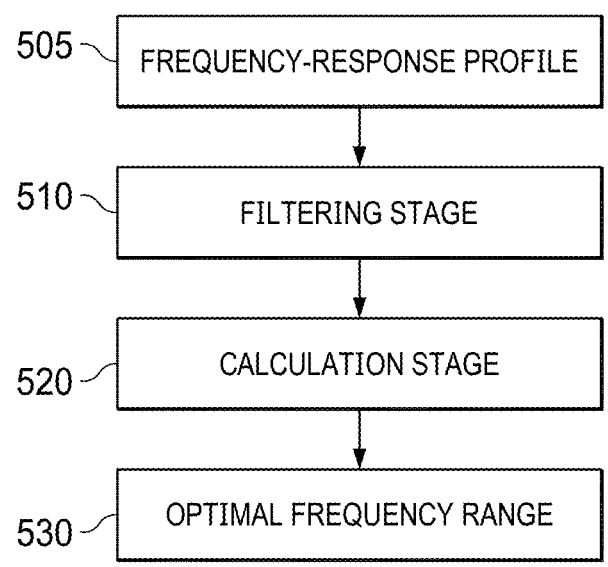
FIG. 5 depicts a process diagram illustrating the main stages of an optimal frequency algorithm according to some embodiments disclosed herein.

The algorithm for optimal frequency works as follows (configuration variables are in all-caps, with current default values). As illustrated in FIG. 5, there are two main stages in the optimal frequency algorithm, the first being creating a filtered view of the frequency response table (510), and the second being the calculation of the optimal frequency range (520).

Filtering Stage:
 a. Take the first FREQ_RESP_MAX=10 rows of the input frequency-response profile 505 (which in the form of a table). The maximum number of rows is configurable based on the needs of a client.
 b. Apply filters on the response rate and conversion rate columns for the table. If the number of responses/conversions are below minimum values RMIN=20 (the minimum number of responses) and CMIN=8 (the minimum number of conversions), invalidate all responses/conversions (respectively) for that bucket and all higher buckets. NFE should be invalidated if conversions are invalidated (in practical terms, set to NULL). The number of response confidence intervals can vary from implementation to implementation.
 c. If a bucket has both responses and conversions invalidated, remove it from the table.
 d. If fewer than FREQ_MIN=4 buckets are available in the filtered table, stop and return N/A.

Calculation Stage:
 a. In the resulting filtered table, identify the frequency bin with the highest NFE value. Call this bucket f_nfe_max, and the NFE for this bucket nfe_max. Add this bucket to the optimal frequency range. The definition of nfe_max may vary from client to client (e.g., due to type of ad, level of profit/revenue, etc.).
 b. Add the buckets adjacent to f_nfe_max if the NFE for these buckets is greater than nfe_max*NFE_FACTOR (NFE_FACTOR=0.6).
 c. Apply the previous step iteratively for all buckets adjacent to those that have been added until buckets around found with nfe<nfe_max*NFE_FACTOR, or the highest/lowest values of the filtered table have been reached.
 d. Special rule: If nfe for a higher-frequency bucket is null due to filtering on insufficient data (from step 1.b above), add the bucket if RR is greater than next-highest bucket.
 e. If the optimal frequency range includes at least OPT_FREQ_WIDTH_MIN=3 bins, return the bins included in the range. Otherwise, return N/A.

A technical challenge relates to the massive size of raw data that may need to be processed in order to obtain useful impression data across devices where adviews are shown. As those skilled in the art can appreciate, this processing can be time consuming and cumbersome. To further enhance the accuracy of the calculated optimal frequency range, eliminate human bias, and reduce errors, some embodiments disclosed herein may leverage computerized tools to aggregate raw data and isolate unique impressions from the raw data (e.g., by using a device graph or a mapping table between individual devices to individuals customers).

Sample Calculation

Taking the above table as input post-filtering, first identify the f=2 bin as having the highest relative NFE, at 113%. Then, add adjacent bins as long as they have relative NFE greater than 113%*0.6=68%. Following this rule, add the f=1 bin, as well as f=3 through 6. The final optimal frequency range returned would be 1 through 6.

Configuration Variables

The configuration variables in the calculation are:
FREQ_RESP_MAX
RMIN
CMIN
FREQ_MIN
NFE_FACTOR
OPT_FREQ_WIDTH_MIN These variables can be client-configurable, via a user interface or dashboard, as static or dynamic. Two additional parameters that are not explicitly set in the configuration are the lookback time, as described above, and the date boundaries for the impressions to be considered in the analysis. In the example above, a fixed lookback window of 1 week is applied, which is consistent with other reporting around reach, frequency, and other performance metrics.

The date boundaries for the optimal frequency calculation are set dynamically for each client system, as described below.

Figure 6:
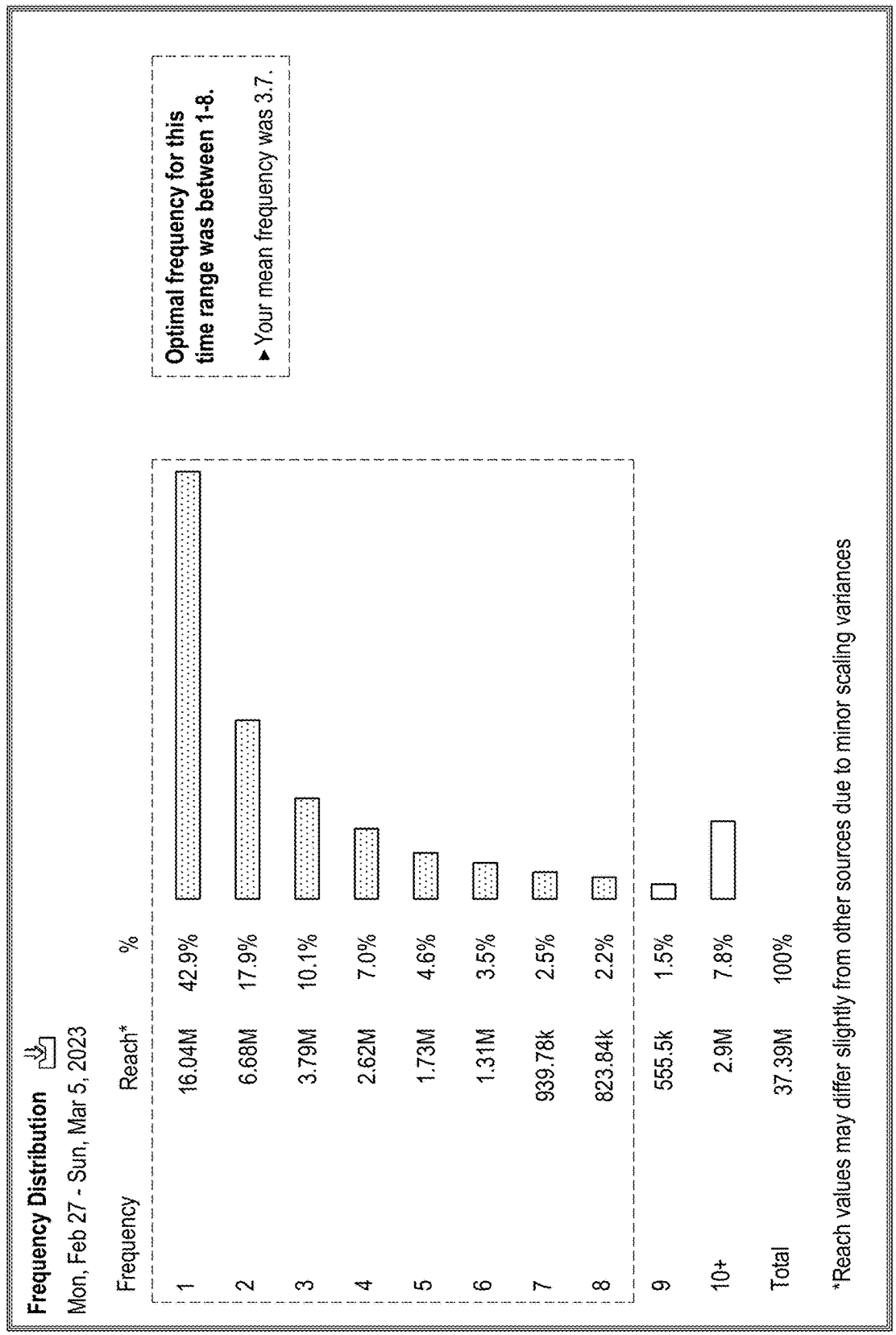
FIG. 6 depicts an example of a user interface displaying an optimal frequency range generated by the optimal frequency algorithm of FIG. 5 according to some embodiments disclosed herein.

FIG. 6 depicts an example of a user interface displaying an optimal frequency range thus generated. In this example, the range and mean frequency are shown next to a bar plot showing weekly frequency for a chosen time period. Other visualizations may also be possible. For example, one or more integers (showing an optimal frequency range or an optimal frequency number) may be displayed.

Dynamic Date Boundary Assignment

In some embodiments, the upper time boundary for data used in the optimal frequency calculation will always be the current date. The lower date will be set dynamically, to match competing objectives of having sufficient data to present results with good statistical confidence, but also focus on recent results for a client.

In some embodiments, the lower date bound can be set as follows: the initial assignment is 3 months before the current date. If a valid optimal frequency range is produced, then this will be used. If an N/A is returned for reasons discussed in the algorithm description, then the process will be repeated with a 6, 9, and 12 month date difference, stopping at the first date assignment that produces a valid result. If no result is produced with a 12 month range, or the current lower date bound is earlier than the client start date and expanding the date range would therefore add no new data, then an N/A result will be returned and the process halted.

Figure 7:
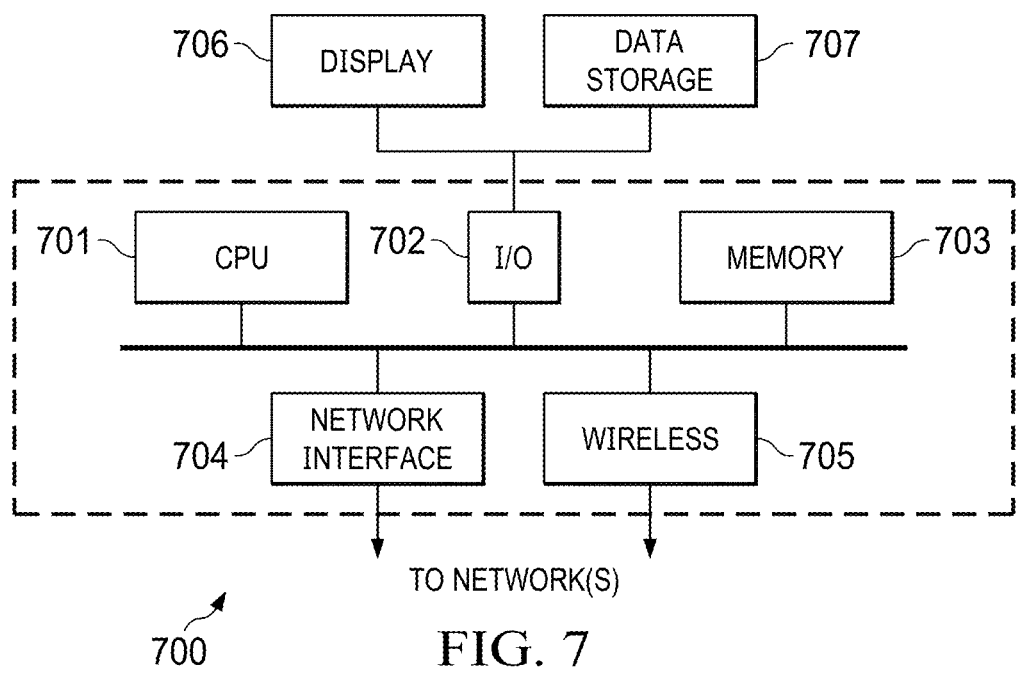
FIG. 7 depicts a diagrammatic representation of a data processing system for implementing a method according to some embodiments disclosed herein.

FIG. 7 depicts a diagrammatic representation of a data processing system for implementing a method disclosed herein. As shown in FIG. 7, data processing system 700 may include one or more central processing units (CPU) or processors 701 coupled to one or more user input/output (I/O) devices 702 and memory devices 703. Examples of I/O devices 702 may include, but are not limited to, keyboards, displays, monitors, touch screens, printers, electronic pointing devices such as mice, trackballs, styluses, touch pads, or the like.

Examples of memory devices 703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 700 can be coupled to display 706, information device 707 and various peripheral devices (not shown), such as printers, plotters, speakers, etc. through I/O devices 702. Data processing system 700 may also be coupled to external computers or other devices through network interface 704, wireless transceiver 705, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein.

The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including Python. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise. The scope of the present disclosure should be determined by the following claims and their legal equivalents.

What is claimed is:

1. A method, comprising:
   determining, by a computer, Internet Protocol (IP)-level impressions from impression data;
   determining, by the computer utilizing the IP-level impressions, household-level impressions;
   correlating, by the computer, the household-level impressions and response and conversion rates so as to determine impressions with associated attribution;
   assigning, by the computer, each of the impressions to a frequency bin based on a rolling frequency calculation;
   determining, by the computer, relative net funnel efficiencies (NFEs) by comparing different frequency bins, each respective frequency bin containing frequency-specific impressions, a frequency-specific response rate, a frequency-specific conversion rate, an NFE determined from the frequency-specific response rate and the frequency-specific conversion rate, and a relative NFE for the respective frequency bin;
   generating, by the computer, a data structure representing a frequency-response profile containing the relative NFEs;
   providing, by the computer, the frequency-response profile as input to an optimal frequency algorithm so as to produce an optimal frequency range based on the relative NFEs; and
   displaying, by the computer, the optimal frequency range through an user interface on a client device.

2. The method according to claim 1, wherein the optimal frequency algorithm comprises a filtering stage and a calculation stage.

3. The method according to claim 2, wherein the frequency-response profile contains frequency-specific response rates and frequency-specific conversion rates and wherein the filtering stage comprises applying filters to the frequency-specific response rates and the frequency-specific conversion rates to invalidate out-of-range NFEs and any frequency bin having out-of-range responses and out-of-range conversions.

4. The method according to claim 2, wherein the calculation stage comprises identifying a frequency bin with highest NFE value and adding the frequency bin thus identified to the optimal frequency range.

5. The method according to claim 1, wherein the different frequency bins comprise a lowest frequency bin and wherein each of the relative NFEs is the NFE of a given frequency bin divided by the NFE of the lowest frequency bin.

6. The method according to claim 1, wherein the determining the household-level impressions comprises obtaining or receiving a household device graph from a data service provider system, wherein the household device graph stores household device information, and wherein the household device information comprises at least one of an IP address, a user agent, or a device type.

7. The method according to claim 1, wherein each of the IP-level impressions, whether linked to a response or not, is assigned to a frequency bin based on a number of previous impressions associated with an IP address occurring within a given time window.

8. A system, comprising:
   a processor;
   a non-transitory computer-readable medium; and
   instructions stored on the non-transitory computer-readable medium and translatable by the processor for:
      determining Internet Protocol (IP)-level impressions from impression data;
      determining, utilizing the IP-level impressions, household-level impressions;
      correlating the household-level impressions and response and conversion rates so as to determine impressions with associated attribution;
      assigning each of the impressions to a frequency bin based on a rolling frequency calculation;
      determining relative net funnel efficiencies (NFEs) by comparing different frequency bins, each respective frequency bin containing frequency-specific impressions, a frequency-specific response rate, a frequency-specific conversion rate, an NFE determined from the frequency-specific response rate and the frequency-specific conversion rate, and a relative NFE for the respective frequency bin;
      generating a data structure representing a frequency-response profile containing the relative NFEs;

providing the frequency-response profile as input to an optimal frequency algorithm so as to produce an optimal frequency range based on the relative NFEs; and displaying the optimal frequency range through an user interface on a client device.

9. The system of claim 8, wherein the optimal frequency algorithm comprises a filtering stage and a calculation stage.

10. The system of claim 9, wherein the frequency-response profile contains frequency-specific response rates and frequency-specific conversion rates and wherein the filtering stage comprises applying filters to the frequency-specific response rates and the frequency-specific conversion rates to invalidate out-of-range NFEs and any frequency bin having out-of-range responses and out-of-range conversions.

11. The system of claim 9, wherein the calculation stage comprises identifying a frequency bin with highest NFE value and adding the frequency bin thus identified to the optimal frequency range.

12. The system of claim 8, wherein the different frequency bins comprise a lowest frequency bin and wherein each of the relative NFEs is the NFE of a given frequency bin divided by the NFE of the lowest frequency bin.

13. The system of claim 8, wherein the determining the household-level impressions comprises obtaining or receiving a household device graph from a data service provider system, wherein the household device graph stores household device information, and wherein the household device information comprises at least one of an IP address, a user agent, or a device type.

14. The system of claim 8, wherein each of the IP-level impressions, whether linked to a response or not, is assigned to a frequency bin based on a number of previous impressions associated with an IP address occurring within a given time window.

15. A computer program product comprising a non-transitory computer-readable medium storing instructions translatable by a processor for:

determining Internet Protocol (IP)-level impressions from impression data;

determining, utilizing the IP-level impressions, household-level impressions;

correlating the household-level impressions and response and conversion rates so as to determine impressions with associated attribution;

assigning each of the impressions to a frequency bin based on a rolling frequency calculation;

determining relative net funnel efficiencies (NFEs) by comparing different frequency bins, each respective frequency bin containing frequency-specific impressions, a frequency-specific response rate, a frequency-specific conversion rate, an NFE determined from the frequency-specific response rate and the frequency-specific conversion rate, and a relative NFE for the respective frequency bin;

generating a data structure representing a frequency-response profile containing the relative NFEs;

providing the frequency-response profile as input to an optimal frequency algorithm so as to produce an optimal frequency range based on the relative NFEs; and displaying the optimal frequency range through an user interface on a client device.

16. The computer program product of claim 15, wherein the optimal frequency algorithm comprises a filtering stage and a calculation stage.

17. The computer program product of claim 16, wherein the frequency-response profile contains frequency-specific response rates and frequency-specific conversion rates, wherein the filtering stage comprises applying filters to the frequency-specific response rates and the frequency-specific conversion rates to invalidate out-of-range NFEs and any frequency bin having out-of-range responses and out-of-range conversions, and wherein the calculation stage comprises identifying a frequency bin with highest NFE value and adding the frequency bin thus identified to the optimal frequency range.

18. The computer program product of claim 15, wherein the different frequency bins comprise a lowest frequency bin and wherein each of the relative NFEs is the NFE of a given frequency bin divided by the NFE of the lowest frequency bin.

19. The computer program product of claim 15, wherein the determining the household-level impressions comprises obtaining or receiving a household device graph from a data service provider system, wherein the household device graph stores household device information, and wherein the household device information comprises at least one of an IP address, a user agent, or a device type.

20. The computer program product of claim 15, wherein each of the IP-level impressions, whether linked to a response or not, is assigned to a frequency bin based on a number of previous impressions associated with an IP address occurring within a given time window.

* * * * *